May 21, 1929.  C. W. KRESS  1,713,664
DISPLAY CABINET
Filed Aug. 31, 1928   2 Sheets-Sheet 1

INVENTOR
Claude W. Kress
BY
his ATTORNEY

May 21, 1929.  C. W. KRESS  1,713,664
DISPLAY CABINET
Filed Aug. 31, 1928  2 Sheets-Sheet 2

INVENTOR
Claude W. Kress
BY
ATTORNEY

Patented May 21, 1929.

1,713,664

UNITED STATES PATENT OFFICE.

CLAUDE W. KRESS, OF NEW YORK, N. Y.

DISPLAY CABINET.

Application filed August 31, 1928. Serial No. 303,280.

My invention relates to display cabinets and refers particularly to display cabinets containing a plurality of shelves.

In display cabinets, it is desirable that the display shelves be in stepped relationship to each other in order that a maximum of commodities may be displayed, that the shelves be readily removable and the number of shelves changed when desired, that no unoccupied shelf supports be visible, that the commodities be protected from dust and that the device be of simple construction and economic production.

The display cabinet of my invention possesses all of the above mentioned, and other desirable features, as will be evidenced upon a consideration of my specification and its accompanying drawings.

In the accompanying drawings illustrating one form of the device of my invention, similar parts are designated by similar numerals.

Figure 1:
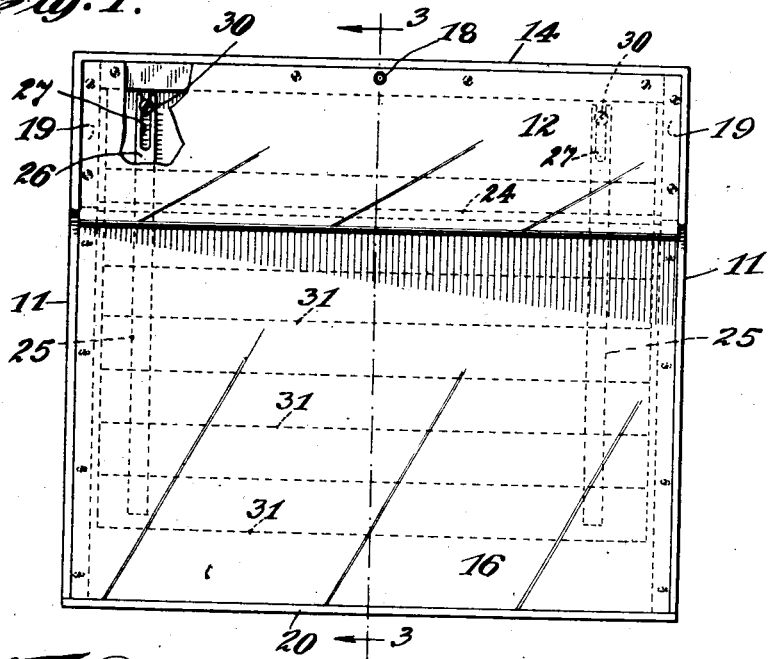
Figure 1 is a top view of one form of the device of my invention.
Figure 2:
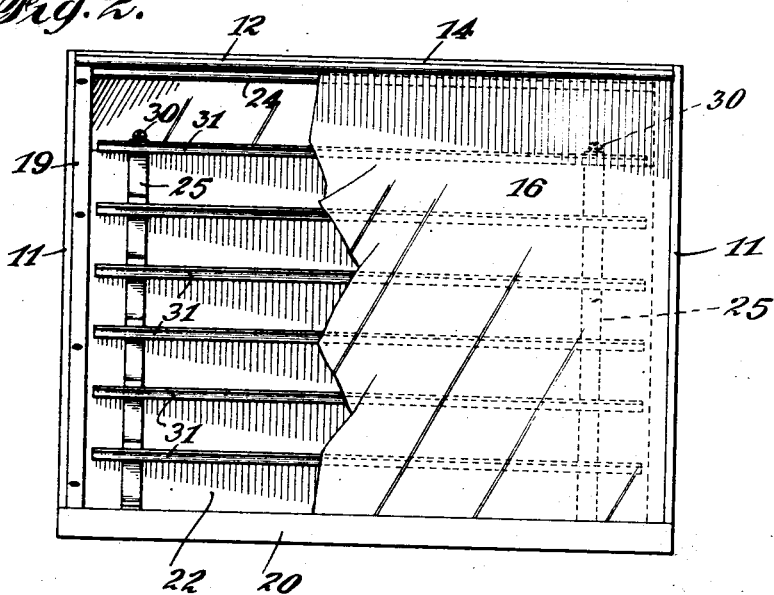
Figure 2 is a front view of the device of Figure 1.
Figure 3:
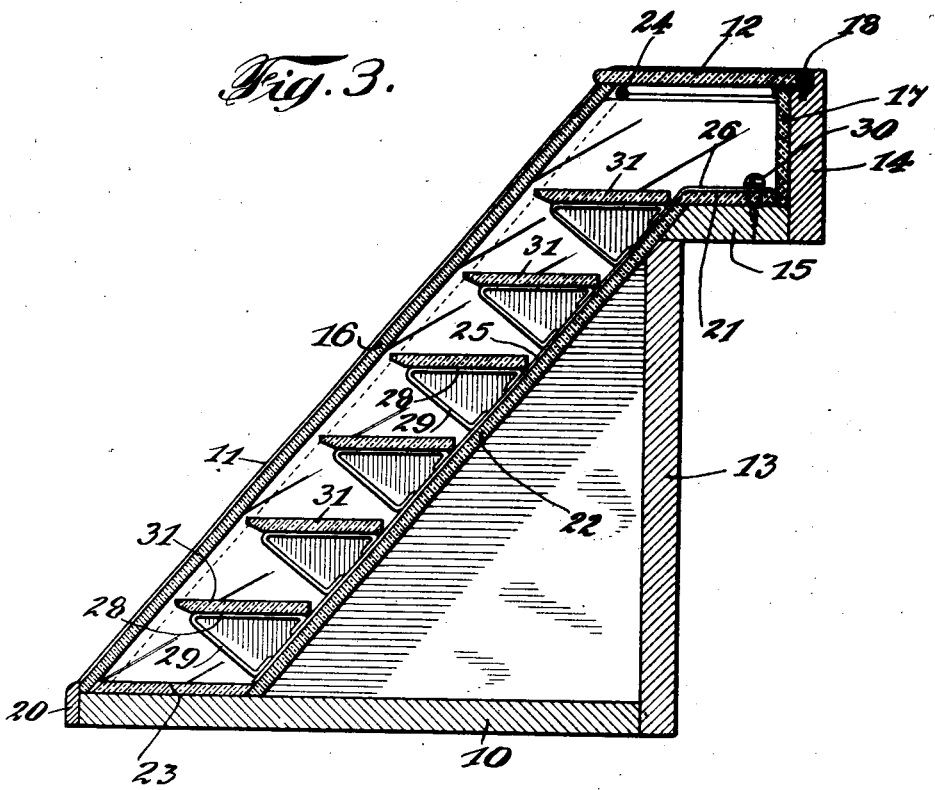
Figure 3 is a section through the line 3—3 of Figure 1.
Figure 4:
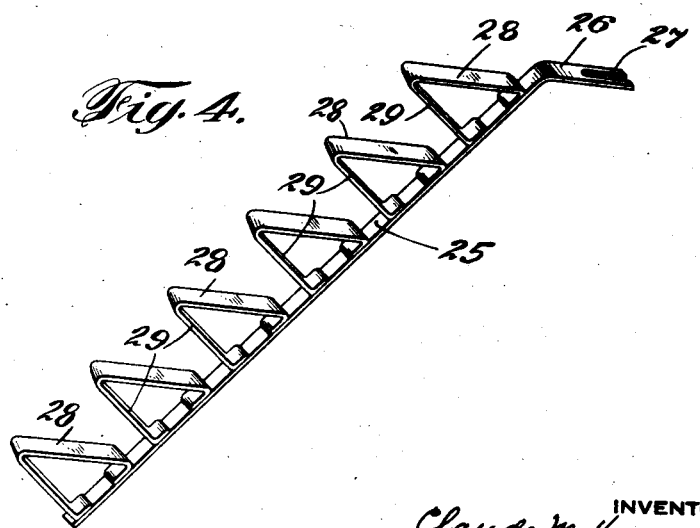
Figure 4 is a perspective view of one of the shelf supporting members.

The particular form of the device of my invention illustrated in the accompanying drawings comprises a casing having the bottom 10, the sides 11, 11, the glass top 12, the lower back 13, the upper back 14, the bottom platform 15 and the glass front 16.

The top 12 rests upon the front 16 and upon the mirror 17 and the back 14. A pin 18 retains the top 12 from accidental displacement.

The front 16 rests upon the supports 19, 19, the lower portion of the front 16 being retained in position by the strip 20.

A mirror 21 rests upon the platform 15 and the mirror 22. A mirror 23 rests upon the bottom 10.

A tie-rod 24 connects the two sides 11, 11.

Within the casing there are two series of stepped shelf supports, each comprising a base 25, the upper portion 26 of which is bent angularly and has a recess 27 therein. A plurality of stepped shelf supports are fixedly attached to the base 25, each support consisting of a tread 28 and a brace 29.

The base 25 and the portion 26 are of such angular construction that the base 25 rests upon the mirror 22 and the portion 26 rests upon the mirror 21. A set-screw 30 passes through a hole in the mirror 21 and into the platform 15.

Two of these series of step supports are positioned within the casing, as shown, the treads of the opposed steps being in the same plane.

A mirror shelf 31 rests upon each pair of opposed step treads 28, 28.

The drawings illustrate my device when in position for exhibition purposes.

When it is desired to change the exhibited commodities the top 12 and the front 16 are removed thus giving access to the shelves.

When it is desired to change the number, or position, of the shelves, the top 12 and the front 16 are removed. The set screws 30, 30 are loosened and the two shelf supporting members removed and a new pair introduced and fixed in position by setting the screws 30, 30, after which the front 16 and the top 12 are replaced.

It will thus be seen that my invention presents a device adapted to exhibit a plurality of commodities upon stepped shelves, in which access to the contents is readily obtained, in which the number and arrangement of shelves may be quickly and easily changed and in which the commodities are protected from dust.

I do not limit myself to the particular size, shape, number or arrangement of parts as shown and described as these are given simply as a means for clearly describing my invention.

What I claim is:—

1. In a display cabinet, in combination, a casing having a bottom, a stepped back and two sides fixedly attached thereto; a removable inclined glass front to said casing; a removable top to said casing; a pair of removable stepped shelf supports positioned within the casing, each shelf support comprising a base parallel to the casing front, the upper portion of said base abutting upon the upper face of the upper tread of the casing back, a plurality of stepped shelf supports carried by each said base, means for removably attaching said base to said upper tread and a glass shelf supported by each pair of aligned step treads of the two shelf supports.

2. In a display cabinet, in combination, a casing having a bottom, a stepped back and two sides fixedly attached thereto; a removable inclined glass front to said casing; a removable glass top to said casing; means for removably attaching said top to said casing back; a pair of removable stepped shelf supports positioned within the casing, each shelf support comprising a base parallel to the casing front, the upper portion of said base abutting upon the upper face of the upper tread of the casing back, a plurality of stepped shelf supports carried by each said base, means for removably attaching said base to said upper tread and a glass shelf supported by each pair of aligned step treads of the two shelf supports.

3. In a display cabinet, in combination, a casing having a bottom, a stepped back and two sides fixedly attached thereto; a removable inclined glass front to said casing; a removable glass top to said casing abutting upon the upper edge of said front and upon the upper edge of said casing back; means for removably attaching said top to said casing back; a pair of removable stepped shelf supports positioned within the casing, each shelf support comprising a base parallel to the casing front, the upper portion of said base abutting upon the upper face of the upper tread of the casing back, a plurality of stepped shelf supports carried by each said base, means for removably attaching said base to said upper tread and a glass shelf supported by each pair of aligned step treads of the two shelf supports.

Signed at New York city, in the county of New York and State of New York this 28 day of August, 1928.

CLAUDE W. KRESS.